(Model.)
B. GREENAWAY.
OVERSHOE FOR HORSES.
No. 287,280. Patented Oct. 23, 1883.
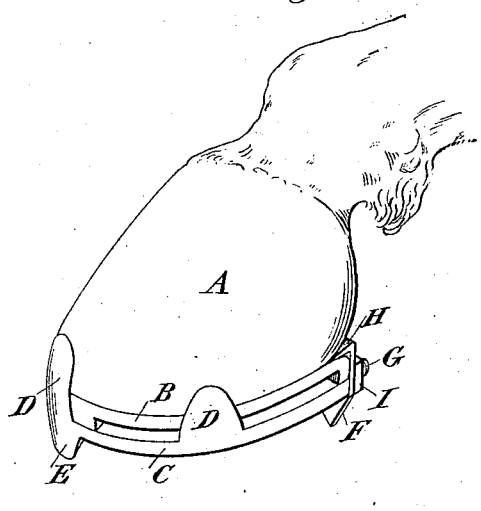
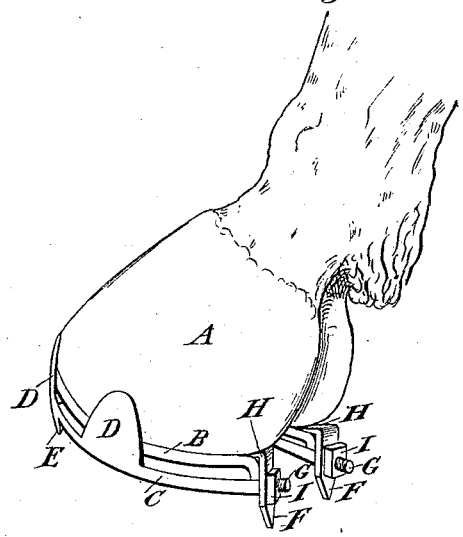
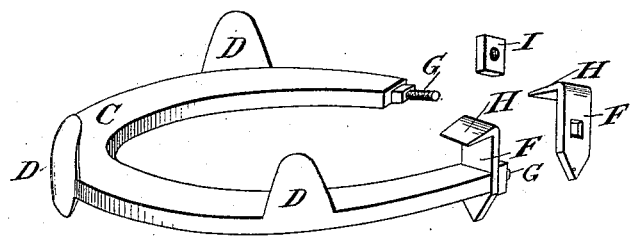
Witnesses:
Frank Pardon
Geo. D. Lee
Inventor:
Benjamin Greenaway
by J. G. Hewitt
Attorney

UNITED STATES PATENT OFFICE.

BENJAMIN GREENAWAY, OF LOUISVILLE, KENTUCKY.

OVERSHOE FOR HORSES.

SPECIFICATION forming part of Letters Patent No. 287,280, dated October 23, 1883.

Application filed July 30, 1883. (Model.)

*To all whom it may concern:*

Be it known that I, BENJAMIN GREENAWAY, a citizen of the United States, residing at Louisville, in the county of Jefferson and State of Kentucky, have invented a certain new and useful Improvement in Overshoes for Horses; and I do hereby declare that the following is a full, clear, and exact description of the construction and operation of the same, reference being had to the accompanying drawings, forming part of this specification.

This my invention relates to certain new and useful improvements in overshoes for horses, to be used as a substitute for rough shoeing in case the road or streets suddenly become icy or slippery, and thereby save the cost of removing the ordinary shoes, by substituting the overshoe in a rough state, which may be required only for a short time, and then removed. These overshoes are made to correspond with the size of the shoe on the horse's foot, and have a raised toe in front and calks in the rear, formed of flat pieces of metal, with a wedge-formed hook turned on the upper ends, so as to hook over the heels of the permanent shoes, between them and the hoof. These last-named calks have a square hole in the center, through which tines formed on the rear ends of the overshoe pass, and, by means of screw-nuts on the ends, the calks are held firmly when the nuts are screwed up, and by means of the flanges at the sides and in front it is still further held in its place.

The object of this my invention is to provide an overshoe for horses, in order to obviate the necessity of removing the ordinary shoes and replacing them with rough shoes in case the roads or streets become covered with ice for a short time, which would soon require the removal of this class of shoes, which would be expensive and attended with loss of time. By the use of this my invention, which requires but little time to apply and adjust the shoe to the foot, causing but slight loss of time, I attain the above object by the device illustrated in the drawings, in which—

Figure 1 is a perspective view of the hoof and shoe, showing the lugs or flanges at the sides and in front. Fig. 2 is a perspective view of the hoof and shoe, showing the adjustable calks in the rear, by means of which the overshoe is secured to the foot or permanent shoe. Fig. 3 is a perspective view of the overshoe, showing its general construction.

Similar letters refer to similar parts throughout the several views.

In the drawings, A A represent the hoof of a horse, and B is the permanent shoe, which is made in the ordinary form and secured to the hoof as are those now in common use.

C is the overshoe, which is made of metal, and in form as shown in the drawings.

D D are the thin lugs or flanges at the sides and in front, to keep the shoe in its place on the foot. This overshoe may be made, as described, with lugs on the sides and in front, or may be made with a flange extending around the entire shoe and fastened by means of small set-screws through it in against the hoof immediately above the permanent shoe; or it may be fastened with small screws to the overshoe C up into the overshoe B or otherwise.

E is the toe, and F F are the rear calks, all of which are made, in form as shown in the drawings, with a square hole in the center of the calks, through which the tines G G on the rear end of the shoe C passes, and by means of which the overshoe is secured to the permanent shoe.

H H are wedge-formed hooks on the upper ends of the calks F, which, in putting on the shoe, are inserted between the hoof and rear end of the permanent shoe, and by means of which the overshoe is held on the foot when the nuts I I are screwed up firmly, and thereby constitute a complete overshoe, that may be put on or taken off with but trifling loss of time when necessary, without interfering with the permanent shoes, which is done by simply unscrewing the nuts F at the rear ends of the shoes, and by turning them down the overshoe can be slipped over the foot, and by replacing the calks F with the wedge-formed hooks H H between the rear ends of the permanent shoe and the hoof, and by screwing up the nuts I I in the rear, the shoe will be held firmly in its place.

What I claim as my invention, and desire to secure by Letters Patent in overshoes for horses, is—

The combination, with the shoe C, having the flanges D or equivalent holding device, as described, and provided with the threaded tines G, of the calks F, having the wedge-shaped hooks H at their upper ends, and of the nuts I, substantially as described, and for the purpose set forth.

BENJAMIN GREENAWAY.

Witnesses:
  FRANK PARDON,
  GEO. D. LEE.